United States Patent [19]

Leiber et al.

[11] Patent Number: 4,877,296
[45] Date of Patent: Oct. 31, 1989

[54] ANTILOCKING SYSTEM FOR A ROAD VEHICLE

[75] Inventors: Heinz Leiber, Oberriexingen; Reinhard Resch, Stuttgart, both of Fed. Rep. of Germany

[73] Assignee: Daimler-Benz Aktiengesellschaft, Stuttgart, Fed. Rep. of Germany

[21] Appl. No.: 220,168

[22] Filed: Jul. 18, 1988

[30] Foreign Application Priority Data

Jul. 18, 1987 [DE] Fed. Rep. of Germany ....... 3723875

[51] Int. Cl.$^4$ .......................... B60T 8/42; B60T 8/40; B60T 13/68
[52] U.S. Cl. .................................... 303/115; 303/116; 303/119
[58] Field of Search .................. 303/61, 92, 100, 113, 303/114, 115, 116, 119, DIG. 3; 188/181 A

[56] References Cited

U.S. PATENT DOCUMENTS

| | | | |
|---|---|---|---|
| 3,480,335 | 11/1969 | Ihada | 303/115 |
| 3,810,682 | 5/1974 | Demers et al. | 303/115 |
| 3,877,759 | 4/1975 | Sekiguchi et al. | 303/115 |
| 3,922,021 | 11/1975 | Every | 303/116 |
| 4,358,163 | 11/1982 | Young | 303/DIG. 3 X |
| 4,436,348 | 3/1984 | Farr | 303/115 |
| 4,767,163 | 8/1988 | Cotigholi | 303/115 X |
| 4,775,196 | 10/1988 | Braschel et al. | 303/119 X |

FOREIGN PATENT DOCUMENTS

| | | | |
|---|---|---|---|
| 0181643 | 5/1986 | European Pat. Off. | 303/119 |
| 2433092 | 1/1976 | Fed. Rep. of Germany . | |
| 3644304 | 7/1987 | Fed. Rep. of Germany . | |
| 0211154 | 9/1986 | Japan | 303/116 |
| 2026114 | 1/1980 | United Kingdom | 303/119 |
| 0003491 | 5/1988 | World Int. Prop. O. | 303/DIG. 3 |

Primary Examiner—Andres Kashnikow
Assistant Examiner—Timothy Newholm

[57] ABSTRACT

An antilocking braking system which operates by controlling the pressure reduction and pressure build-up phases at vehicle wheel brakes by changing the volume of a primary chamber of a pressure modulator, to which the wheel brakes are connected via a brake pressure 2/2-way solenoid controlled valve and an inlet valve. The primary chamber of the pressure modulator is connected to a pressure output of a brake booster. The pressure modulator is designed as a hydraulically driven pump whose feed volume per stroke corresponds to approximately 25% to 50% of the maximum brake fluid quantity which can be expelled into the connected brake circuit, and if, when the inlet valve is closed, one stroke of the pump is not sufficient to achieve a required pressure reduction at the connected wheel brakes, then the pump is switched to a return feed mode in that the brake pressure control valves are driven to their blocking positions and the inlet valve is driven to its open position.

16 Claims, 4 Drawing Sheets

ANTILOCKING SYSTEM FOR A ROAD VEHICLE

BACKGROUND AND SUMMARY OF THE INVENTION

The invention relates to an antilocking braking control system for a road vehicle having a hydraulic multiple circuit brake system with at least one closed brake circuit which is connected to an output pressure space of a brake booster in which a static pressure, proportional to the force of actuation, is generated. This pressure is connected to a primary chamber of a pressure modulator provided to control pressure reduction, pressure build-up, as well as pressure maintenance phases of the antilocking control system for the at least one wheel brake of the static brake circuit via an inlet valve, which is mechanically drivable into its open position. The wheel brake can be connected to, or alternatively closed off from, the primary chamber of the pressure modulator via an electrically controllable brake pressure control valve, formed as a 2/2-way solenoid valve.

The inlet valve, which is mechanically drivable into an open position, is located in a primary chamber of a pressure modulator for controlling pressure reduction and pressure build-up, as well as pressure maintenance phases of the antilocking control system, to at least one wheel brake of the static brake circuit. The wheel brake is connectable to, and alternatively closed off from, the primary chamber of the pressure modulator.

The antilocking system has a hydraulic multiple circuit wheel brake system, comprising at least one closed static brake circuit which is connected to at least one wheel brake from an output pressure space of a brake booster in which an output pressure proportional to an actuation force is generated.

The connection includes an inlet valve means for connecting the brake booster to a primary chamber of a pressure modulator means having a pressure output line leading to at least one wheel brake via at least one electrical 2/2-way solenoid controllable brake pressure control valve means for controlling pressure build-up, pressure reduction and pressure maintenance phases respectively of said antilocking control system.

The one wheel brake is connected to or closed from the output of the primary chamber by the brake pressure valve means. The pressure modulator means has a hydraulically driven pump with a drive pressure space connected to the pressure modulator means to displace the piston pump. An electrically controllable ABS function control valve means connecting the drive pressure space alternatively to a pressure output of a hydraulic auxiliary pressure source and to its pressureless reservoir.

The piston pump separates the primary chamber from the drive pressure space. The piston pump is displaceable by the pressure in the drive pressure space when the inlet valve is open, with the piston pump displacement being opposed by a powerful restoring spring and against pressure prevailing in the primary chamber, and being displaceable to an end position, associated with a minimum volume of the primary chamber when the drive pressure space is connected to the auxiliary pressure source by the ABS control valve, and to another end position associated with a maximum volume of the primary chamber by action of the restoring spring, when said ABS control valve connects the drive pressure space to the reservoir of the auxiliary pressure source.

The maximum volume expansion or minimum volume reduction of the primary chamber corresponds to between 25% and 50% of the volume of brake fluid quantity which can be expelled by an actuation of said brake booster with the maximum force actuation which can be applied into said brake circuit.

An electronic ABS control unit generates control signals required for the appropriate control of the ABS control valve and of the brake pressure control valve in response to vehicle wheel speed proportional output signals from vehicle wheel speed sensors associated with the vehicle wheels.

An antilocking system of this type is the subject of Applicants' German Unpublished patent application P 36 37 781.3-21, which corresponds to U.S. patent application Ser. No. 07/116,867, filed Nov. 5, 1987, and now pending in Patent Examining Group 314.

In the antilocking control system described therein, the pressure modulator associated with the closed brake circuit, for example the front axle brake circuit, is of the type of a hydraulically driven pump having a feed pressure space (the primary chamber) which is movably defined and separated from a secondary chamber (the drive pressure space) by a modulator piston. The drive pressure space is connectable by means of an ABS function control valve to the high pressure output of an auxiliary pressure source, whereby the modulator piston is pushed into an end position, associated with a minimum volume of the primary chamber against the action of a powerful restoring spring. In this end position of the piston, an inlet valve, designed as a ball-seat valve, is held in its open position by a tappet supported on one side by a valve ball, and on the other side by the piston, as a result of which the output pressure space of the brake booster which is connected with inlet valve, communicates with the primary chamber.

The two front wheel brakes are each connected to an output of the primary chamber via a brake pressure control valve designed as a 2/2-way solenoid valve. In the normal operating state of the brake system, i.e., when the brake system is not subjected to antilocking control, the high output pressure of the auxiliary pressure source is connected to the drive pressure space of the pressure modulator, and the piston of the latter is thereby held in the end position associated with a minimum volume of the primary chamber.

The piston and the auxiliary pressure source are so dimensioned that the piston remains in the above-mentioned end position, even if a braking action is performed with the maximum brake pressure. This maximum pressure is connected to the wheel brakes via the open inlet valve, the primary chamber and brake control valves when in their basic positions. If a locking tendency occurs at one of the braked wheels, which requires a pressure reduction in the wheel brake, then the brake pressure control valve of the other wheel brake is driven to its blocking position, and the ABS control valve is driven to an excited position, in which the control pressure previously connected to the drive pressure space of the pressure modulator can be released towards a pressureless reservoir of the auxiliary pressure source. As a result, the piston is subjected to a displacement in the sense of a volume enlargement of the primary chamber, under the influence of the restoring spring and the brake pressure in the primary chamber. The inlet valve reaches its blocking position after a small initial displacement of the piston in this displacement direction, and a pressure reduction at the brake to be controlled is achieved as the volume of the primary chamber is further enlarged.

The pressure modulator is s dimensioned that the maximum pressure reduction stroke of the modulator piston is sufficient for this, even if previously almost all of the maximum possible brake pressure was coupled into the wheel brakes and has to be reduced to a large degree by the control system. A pressure reduction of this kind, within one piston stroke, however, is no longer possible when the control system is effective on both wheel brakes.

For example, when a detected output signal of a position indicator, provided for the recording the piston position and characteristic of the piston position, no longer changes while the control system still continues to call for a pressure reduction at the wheel brakes, the brake pressure control valves of both wheel brakes are driven to their locking position.

The drive pressure space of the pressure modulator is again connected to the high output pressure of the auxiliary pressure source, as a result of which the modulator piston is then subjected to a displacement in the sense of a reduction of the volume of its primary chamber. The inlet valve has a construction corresponding to a non-return valve which opens as a result of the pressure building up in the primary chamber and brake fluid being expelled back out of the primary chamber into the tandem master cylinder. The pressure modulator functions in this phase like the return feed pump of known antilocking control systems.

After completing such a return feed stroke of the pressure modulator, the pressure reduction mode can be continued again by renewed displacement of the piston in the sense of an enlargement of the volume of the primary chamber. In order that the brake system, while operating without the antilocking control functions, remains functional even when the auxiliary pressure source has failed and the piston of the pressure modulator withdraws to its end position associated with a maximum volume of the primary chamber, a bypass valve designed as a ball-seat valve is provided which releases a second pressure medium flow path leading from the brake booster to the primary chamber of the pressure modulator as soon as the piston has reached a minimum distance, corresponding to the greatest part of its maximum stroke.

The valve ball, which up until then was pushed into its blocking position by a spring-loaded closing element, is taken along with the piston from the point where the latter reaches a minimum stroke, so that the ball can separate from the valve seat.

Irrespective of numerous advantageous functional features of this antilocking control system in comparison to antilocking control systems of similar construction, an unfavorable feature is evident in the case where the auxiliary pressure source, although it has not failed completely, supplies only a reduced output pressure. There, the modulator piston can no longer be pushed into its end position, associated with a minimum volume of the primary chamber, by subjecting its drive pressure space to high pressure. This end position is also utilized for the non-controlled braking mode, so that the piston withdraws slightly under the influence of the brake pressure connected to the primary chamber, as a result of which the inlet control valve can reach its blocking position even during the normal braking mode, and this leads to at least a restriction of the utilizable brake pressure, which of course is unacceptable.

Even more unfavorable is of course the case when the output pressure of the auxiliary pressure source is no longer sufficient to displace the piston, against the bias restoring force of the powerful restoring spring, at least close enough to its end position, associated with a minimum volume of the primary chamber. Such a displacement is necessary for the valve ball of the inlet valve to be lifted off its valve seat during at least part of its normal opening stroke, and for the bypass valve to remain held in its blocking position by the still partially possible displacement of the modulator piston. If this displacement does not occur, it is no longer possible to brake at all with the brake circuit connected to the pressure modulator. The relatively complicated mechanical construction of the pressure modulator, including the inlet and the bypass valves, can also be seen as a disadvantage, albeit a less grave one.

The object of the invention is therefore to improve an antilocking control system of the type aforementioned that is less susceptible to malfunctioning and is of a simple construction, and in particular, one that ensures that the brake system remains functional even if the auxiliary pressure source fails. This insurance of function is obtained by utilization of a bypass flow path as will be explained subsequently.

This object is achieved according to the invention by having the inlet valve means operating as a change over solenoid valve which in normal non-ABS brake mode, occupies a basic position connecting the primary chamber of the pressure modulator to the pressure output of the brake booster. The inlet valve means is controlled by output signals of the electronic control unit of the ABS to an excited "I" position closing off of the primary chamber of the pressure modulator from the pressure output of the brake booster, during pressure reduction as well as pressure build-up phases of the antilocking control system. The inlet valve means is switched back to its basic "O" position when the pressure modulator functions in the return feed mode at the same time as the brake pressure control valve means of the wheel brakes connected to the pressure modulator are switched back to excited "I" positions.

As a result of the design of the inlet control valve as a solenoid valve, this inlet valve can be driven independently of the current position of the modulator piston into the respective function position appropriate to the situation. This ensures that braking is possible in each possible position of the piston. The additional technical expenditure entailed by the solenoid valve is offset by a considerable simplification of the construction of the pressure modulator, since both a mechanical inlet valve and a mechanical bypass valve along with the actuation or closing elements necessary for their control, are dispensed with. As a result, the pressure modulator can be manufactured considerably cheaper and also with smaller dimensions.

As a result of having an antilocking system, wherein a position indicator is provided which generates electrical output signals characteristics of the position of the pressure modulator piston pump, which are connected to the electronic ABS control as further information inputs, and when the inlet control valve means is switched back to its basic position during an antilocking control cycle, comprising several pressure reduction, pressure maintenance, and pressure build-up phases, when the ABS control valve has been switched to its basic "O" position and the at least one brake pressure control valve means is in its excited "I" position, and wherein the output signals of said position indicator indicates that the piston pump is moving to its end position associated with a minimum volume of the primary chamber, a preferred embodiment of the antilocking system is possible which provides simple logical combinations, to control the solenoid valve in a sequence and duration appropriate for control.

It is achieved after having the inlet valve control valve driven to its excited "I" position in the course of an antilocking control phase, that the inlet control valve is switched back into its basic "O" position even if in the course of control, vehicle deceleration, detectable as a result of the change of output signals of the wheel speed sensors, lessens by more than a given threshold value, that the pressure in the primary chamber is matched as quickly as possible to the control pressure generated by the driver through the brake booster. This is true regarding a building-up of brake pressure, as well as a reduction of brake pressure.

When the wheel brake subjectable to the antilocking control system is connected via a one-way valve to a bypass line leading to the pressure output of the brake booster, it is advantageous to have the bypass line connected to the wheel brakes via a one-way valve which, when the driver throttles back the brake pedal during a control phase, brake pressure can be reduced rapidly.

As a result of the fact that the ABS control valve has a flow path, effecting the connection of the pressure output of the auxiliary pressure source to the driver pressure space of the pressure modulator when the ABS control valve is in the basic "O" position, via a throttle which restricts the pressure medium flow rate to the drive pressure space in the pressure modulator to a given value, this enables the change rates of the brake pressure in pressure build-up and pressure reduction phases of the antilocking control system to be placed in an optimum relation to each other.

A further ABS controlled function control is provided between the ABS function control valve means and a pressure reservoir of an auxiliary pressure source chargeable by an accumulator-type charge pump. The pressure reservoir is maintained at a specific output pressure level by opening a pressure-limiting valve connected between the pressure output of the pump and a return line leading to a reservoir of the pump, while the further function control valve means is connected, via a one-way valve, to the ABS function control valve means when the high pressure output of the pump is closed from the return line and the further function valve is in its basic position. The further function valve, in its excited position, closes off the pressure reservoir from the pressure output of the auxiliary pressure source while the pressure output of the pump is connected to the return line leading to a pressureless reservoir of the auxiliary pressure source.

With this arrangement pressure maintenance phases of the antilocking control system and at the same time the charging of a pressure reservoir are provided within the framework of the auxiliary pressure source and can be controlled in a simple manner. It is also possible with the aid of this further function valve to operate the accumulator-type charge pump sparingly by utilizing a pressure limiting valve, the opening pressure of which determines the reservoir pressure level.

The pressure modulator has a step cylinder having at least two bore steps of different diameter which merge into one another via housing step; and a correspondingly stepped modulator piston pump with a larger piston step forming a movable delimitation of the drive pressure space and a smaller piston step a movable delimination of the primary chamber of the pressure modulator. The piston is sealed against the respective stepped bore and has a central tapering section with a conical outer surface on which an actuating pin of a piston indicator is radially supported. The piston position indicator comprises a travel/voltage converter, by means of which radial displacements of said actuating pin associated with axial movements of said piston pump are converted into voltage signals which can be processed by the electronic control unit of the ABS. As a result thereof a simple embodiment of the modulator piston and position indicator suitable for monitoring its position are provided to permit an exact establishment of the current position of the piston as well as its speed of travel.

An additional feature of the invention is the restoring spring, which biases the modulator piston into its end position associated with a maximum volume of the primary chamber. It is designed as a helical pressure spring which is accommodated in a central blind bore of the modulator piston in a section of its length, approximately corresponding to an axial extension of the smaller piston step and the central conical section of the piston. As a result, the restoring spring still develops a desirable amount of force even in the end position of its piston, i.e., the end associated with a maximum volume of the primary chamber of the pressure modulator.

When the modulator piston is supported in the housing of the pressure modulator, an additional restoring spring, the restoring force of which is of a maximum at the position associated with a minimum volume of the primary chamber, also biases the piston as it is displaced increasingly away from this minimum volume position. The force of this additional restoring force reduces to a zero value at approximately $\frac{1}{4}$ to $\frac{1}{3}$ of the total stroke of the piston. A considerable restoring force is thus available in the particular one stroke region of the piston directly adjacent to the end position associated with a minimum volume of the primary chamber. The two restoring springs have a suitable dimensioning wherein the sum of the maximum values of the restoring forces of the biasing springs and the force resulting from a maximum output pressure of the brake booster acting upon the piston in the primary chamber, all operate in the sense of an enlargement of the primary chamber volume, and are of a value which is at least less than, or approximately equal to, the force in the driven pressure space which displaces the piston into its end position associated with a minimum volume of the primary chamber when the modulator piston is subjected to the output pressure of the auxiliary pressure source. Such a control system allows for counter-phase control, i.e., the brake pressure can be built up in one wheel brake, while brake pressure is reduced at the other wheel brake.

By having a 2/2-way solenoid bypass valve means connected between a pressure output of the brake booster and the connection, leading from a pressure output of the primary chamber of the pressure modulator to the at least one wheel brake, and wherein the bypass valve means and the inlet valve means are controlled together to move from a basic "O" position into an excited blocking "I" position, the reliability of the antilocking system and the brake system as a whole can be improved.

It is advantageous to have the modulator piston include an electronic pressure sensor to provide an output indicative of the pressure in the primary chamber of the modulator piston to the ABS electronic control.

The pressure sensor can comprise a sensor element fixed between two separated parts of the piston and which is subject to a compression or deformation due to at least one of the piston parts being responsive to the pressure in the primary chamber of the pressure modulator. The sensor could be any of a compression-sensitive or expansion-sensitive electrical resistor or piezoelectric element.

Other objects, advantages and novel features of the present invention will become apparent from the following detailed description of the invention when considered in conjunction with the accompanying drawings.

DETAILED DESCRIPTION OF THE DRAWINGS

Figure 1:
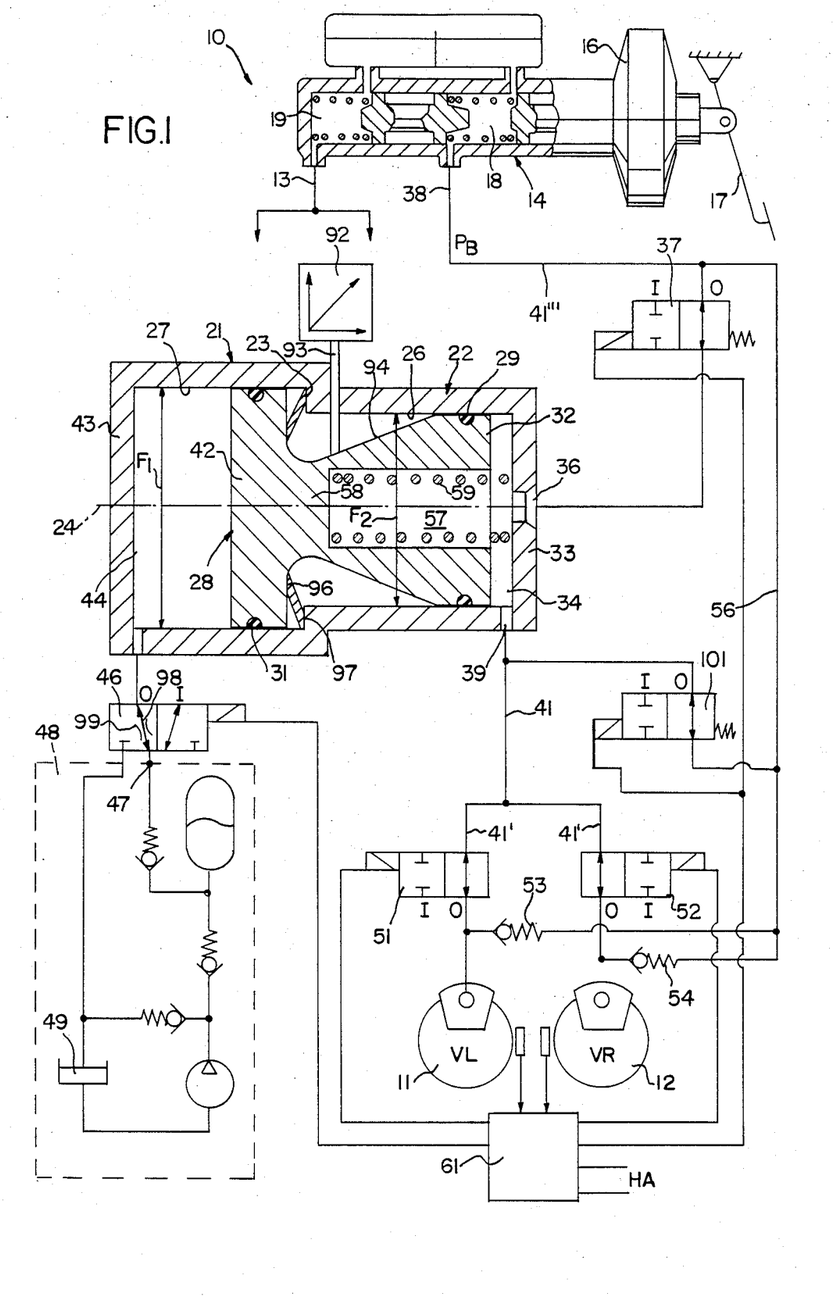
FIG. 1 shows a simplified diagrammatic representation of an antilocking control system according to the present invention, related essentially to the front axle brake circuit of a road vehicle, having only one pressure modulator provided for the control of brake pressure at the two wheel brakes of this brake circuit.

The essential functional elements of an antilocking control system 10 for a road vehicle is provided with a hydraulic dual circuit brake system. The vehicle front wheel brakes 11 and 12 are combined in a front axle brake circuit I, and the rear brakes, not shown for the sake of simplicity, are combined in a rear axle brake circuit II, which is represented in the illustration of FIG. 1 merely by its master brake line 13 branching towards the rear wheel brakes. Both brake circuits I and II are assumed to be static brake circuits.

A tandem master cylinder 14 of conventional construction is provided as brake booster, and can be actuated via a brake power assist unit 16, for example a vacuum brake power assist unit, by the brake pedal 17. As is normal, the front axle brake circuit I is connected to the primary output pressure space 18, and the rear wheel brake circuit II is connected to the secondary output pressure space 19 of the tandem master cylinder 14.

The antilocking control system for both the rear axle and the front axle of the vehicle, can utilize the same construction principles so that it is sufficient to describe the constructional and functional details of the anti locking control system 10 only with reference to the front axle. Alternatively, the antilocking control system at the rear axle might utilize the known return feed principle. Where letter indices are used in the description below, the index "V" denotes the front axle, the index "H" denotes the rear axle, the index "L" denotes the left side of the vehicle, and the index "R" denotes the right side of the vehicle.

In the specific exemplary embodiment shown in FIG. 1, a pressure modulator, denoted overall by 21, is provided as the central element of the antilocking control system 10 effective at the front axle for controlling pressure modulator brake pressure reduction and brake pressure build-up phases in the course of an antilocking control cycle being executed at one or the wheel brake(s) 11 and/or 12 of the front axle brake circuit I, respectively.

The pressure modulator 21 is designed as a step cylinder, the housing 22 of which has two bore steps 26 and 27 which are mutually offset and interconnected respectively via a radial step 23, and which bore steps are coaxial with respect to the central longitudinal axis of the modulator housing 22. A correspondingly stepped modulator piston 28 is seated in these bores and is sealed therein by circumferential seals 29 and 31.

A primary chamber 34 of the pressure modulator 21 is bounded in axial direction by the smaller diameter piston flange 32 of the movable modulator piston 28 within the smaller bore step 26 and by fixed end wall 33 which closes off this bore step 26 from the outside. The primary chamber 34 has a pressure input 36 connected via a control valve 37, designed as a 2/2-way solenoid valve to the primary pressure output 38, associated with the front axle brake circuit I, of the tandem master cylinder 14, as well as to a pressure output 39, to which the main brake line 41, branching to the wheel brakes 11 and 12, of the front axle brake circuit I is connected. A drive pressure space 44 is bounded in axial direction by the larger annular flange-shaped piston step 42 of the movable modulator piston 28 and by the end wall 43 of the modulator housing 22. The end wall 43 closes and seals off the housing bore 27 in which the larger piston step 42 of the modulator piston moves. The drive pressure space 44 can be connected via an antilocking control system ABS control valve 46 alternatively to an output 47, maintained at a high pressure level of a hydraulic auxiliary pressure source 48, or can be connected to pressureless reservoir 49.

The ABS control valve 46 is designed as a 3/2-way solenoid valve, in the basic "O" position of which, the drive pressure space 44 of the pressure modulator 21 is connected to the pressure output 47 of the auxiliary pressure source 48, and blocked from the reservoir 49. In the excited "I" position, the drive pressure space 44 of the pressure modulator 21 is connected to the reservoir 49 of the auxiliary pressure source 48, and blocked from the pressure output 47 thereof.

The brake pressure control valves 51 and 52 are connected to brake line branches 41' of the front axle brake circuit I, and can be actuated individually or, from time to time, jointly by the pressure output 39 of the pressure modulator 21 to control the pressure build-up phases of the antilocking control system. These valves are designed as 2/2-way solenoid valves whose basic "O" position is the through-flow position, and whose excited "I" position is the blocking position.

Further, the wheel brakes 11 and 12 are each connected via one-way pressure responsive valves 53 and 54 to a bypass line 56, which in turn is connected directly to the primary pressure output 38 of the tandem master cylinder 14, or respectively to a brake line section 41'" of the front axle brake circuit I. The brake line section 41'" leads from the tandem master cylinder 14 to the control valve 37 by means of which this primary pressure output 38 can be blocked from the pressure input 36 of the pressure modulator 21 in the excited "I" position and opened to the pressure input 36 in the basic "O" position.

The one-way valves 53 and 54 are subjected to higher pressure in the wheel brake cylinders of the front wheel brake 11 and 12 than in the bypass line 56, or in the primary output pressure space 18 of the tandem master cylinder 14, and are opened when the driver reduces the pedal actuation force, so that even if the inlet control valve 37 sticks in its blocking position, brake pressure can be reduced via the bypass line 56.

The modulator piston 28 is provided with a central blind bore 57, the depth of which, measured in the direction of the central longitudinal axis 24, corresponds approximately to the length of the smaller diameter piston step 32 and is open towards the primary chamber 34 of the pressure modulator 21. A powerful restoring spring 59 is supported on the base 58 of this bore 57 and on the end wall 33, which closes off the smaller bore step 26 from the outside. The restoring spring 59 attempts to push the modulator piston 28 out of its illustrated position, which corresponds approximately to the end position of the piston 28 associated with a minimum volume of the primary chamber 34, into its other end position associated with a maximum volume of the primary chamber 34, to produce a minimum volume of the drive pressure space 44. The modulator piston 28 is supported in this other end position (on the left according to FIG. 1) at the end wall 43, while closing off the larger bore step 27 of the modulator housing 22.

Before reference is made to the specific constructional details of the pressure modulator 21 and its function, it will first be explained how the pressure build-up, pressure maintenance and pressure reduction phases required for the antilocking control system can be controlled with the function components of the ABS 10 at the front wheel brakes 11 and 12. The operation of the safety bypass valve 101 and monitoring control 92 will be explained later.

As long as the antilocking control system has not been actuated, the inlet control valve 37, the ABS control valve 46 and the brake pressure control valves 51 and 52 occupy their illustrated basic "O" positions The piston 28 of the pressure modulator 21 is subjected on its surface $F_1$, corresponding to the cross-sectional area of its large piston step 42, to the high output pressure $P_A$ of the auxiliary pressure source 48, which is coupled into the drive pressure space 44 of the pressure modulator 21 via the ABS control valve 46, when in its basic "O" position.

The modulator piston 28 is subjected on its surface $F_2$, corresponding to the cross-sectional area of the smaller piston step 32, to the brake pressure $P_B$ generated by the brake booster 14, and connected to the primary chamber 34 via the inlet control valve 37 occupying its basic "O" position. Brake pressure $P_B$ is also corrected to the wheel brakes 11 and 12 of the front axle brake circuit I via the brake pressure control valves 51 and 52 and the pressure output 39 of the pressure modulator 21.

The ratio $F_1/F_2$ of the effective piston surfaces of the modulator piston 28 is sufficiently large, so that even if the maximum brake pressure $P_B$, attainable by actuation of the brake booster 14, is coupled into the primary chamber 34, the piston 28 can be pushed to the right by subjecting its large piston area 42 to the output pressure $P_A$ of the auxiliary pressure source 48 against the increasing restoring force of the restoring spring 59 and the pressure force $P_B$ in chamber 34 in its right end position and associated with a minimum volume of the primary chamber 34, and can be held in this position as long as the control pressure space 44 is connected to the high pressure output 47 of the auxiliary pressure source 48.

If a locking tendency occurs during the course of a braking action, for example on the left front wheel, then an initial pressure reduction phase of an antilocking control cycle is required. To provide for this pressure reduction phase, the control valve 37, connected between the pressure output 38 of the brake booster 14 and the pressure input 36 of the pressure modulator 21, is switched to its excited "I" position; i.e., the blocking position. The ABS control valve 46 is likewise switched to its excited "I" position; i.e., the through-flow position connecting the drive pressure space 44 to the pressureless reservoir of the auxiliary pressure source 48. The brake pressure control valve 52 of the right front wheel brake 12 is likewise switched to its excited "I" position; i.e., the blocking position, while the brake pressure control valve 51, which is associated with the left wheel brake 11 at which the brake pressure is to be reduced, remains in its basic "O" position; i.e., the through-flow position.

The pressure reduction is achieved by the displacement of the modulator piston 28, due to the movement of the ABS valve 46 to its excited "I" position where the pressure in the drive pressure space 44 is vented to reservoir 49, and by the restoring spring 59 and the pressure $P_B$ trapped in the primary chamber 34 by virtue of the inlet valve 37 being moved to its excited "I" position to provide a volume enlargement of the primary chamber 34. The brake fluid can now flow out of the left front wheel brake 11 into the primary chamber 34 of the pressure modulator 21 via brake pressure control valve 51 retained in its basic "O" position and conduits 41', 41 and 39. Pressure reduction phases at the right wheel brake or pressure reduction phases required at both front wheel brakes 11 and 12, are controlled analogously.

If, after a pressure reduction phase, the brake pressure is to be maintained at the front wheel brake(s) subjected to the control system, then, while the control valve 37 remains in its blocking position, the two brake pressure control valves 51 and 52 are driven to their excited "I" blocking positions while the ABS control valve 46 is switched back to its basic "O" position. As a result of this, the output pressure $P_A$ of the auxiliary pressure source 48 is again present in the drive pressure space 44, but the piston 28 cannot be displaced in the sense of a brake pressure build-up, since the primary chamber 34 of the pressure modulator 21 is blocked both from the tandem master cylinder 14 via the inlet control valve being in its excited "I" position, and from the wheel brakes 11 and 12 via brake pressure control valves 51 and 52 being in their excited "I" positions.

It is sometimes desired to have a subsequently required pressure build-up phase at the front brake(s), so that the brake pressure control valve 51 and/or 52 of the respective front wheel brake(s) 11 and/or 12 is switched back to its basic "O" position, while the control valve 37 remains held in its excited "I" blocking position precluding fluid contact with the tandem master cylinder.

Under the influence of the output pressure $P_A$ due to the auxiliary pressure source 48 being coupled into the drive pressure space 44 of the pressure modulator 21 the modulator piston 28 is therefore subjected to a displacement to the right, in the sense of a reduction of its primary chamber 34, as a result of which brake fluid, which had been previously received in the primary chamber 34 from the wheel brake(s) 11 and/or 12 subject to the control system in the sense of a pressure reduction, is therefore pushed back again, in the sense of a pressure build-up, into the front wheel brake(s) 11 and/or 12.

If, after a pressure build-up phase, controlled in this manner by the antilocking control system, a locking tendency no longer occurs at the front axle, then the inlet control valve 37, connected between the tandem master cylinder 14 and the pressure modulator 21, is switched back to its basic "O" position, so that the output pressure $P_B$ of the tandem master cylinder 14 is again available for a further brake pressure build-up.

The control signals required for appropriately controlling the function of the inlet control valve 37 and the ABS valve 46, as well as the brake pressure control valves 51 and 52, are generated according to known criteria by an electronic ABS control unit 61 (diagrammatically shown in FIG. 1), essentially by a comparing and differentiating processing of the output signals from wheel-spaced sensors 62 and 63 (FIG. 2), which are provided to monitor the movement behavior of the vehicle wheels and which output electrical signals characteristic of their circumferential speeds.

In the ABS 10 according to FIG. 1, various control phases are possible at the two front wheel brakes 11 and 12 inasmuch as the brake pressure can be maintained at one wheel brake 11 or 12, while it is lowered or increased at the other front wheel brake 12 or 11, respectively. Unfortunately, a counter-phase brake pressure change at both front wheel brakes 11 and 12, in the sense that the brake pressure is increased at one wheel brake 11 or 12 and simultaneously lowered at the other wheel brake 12 or 11, is not possible.

Figure 2:
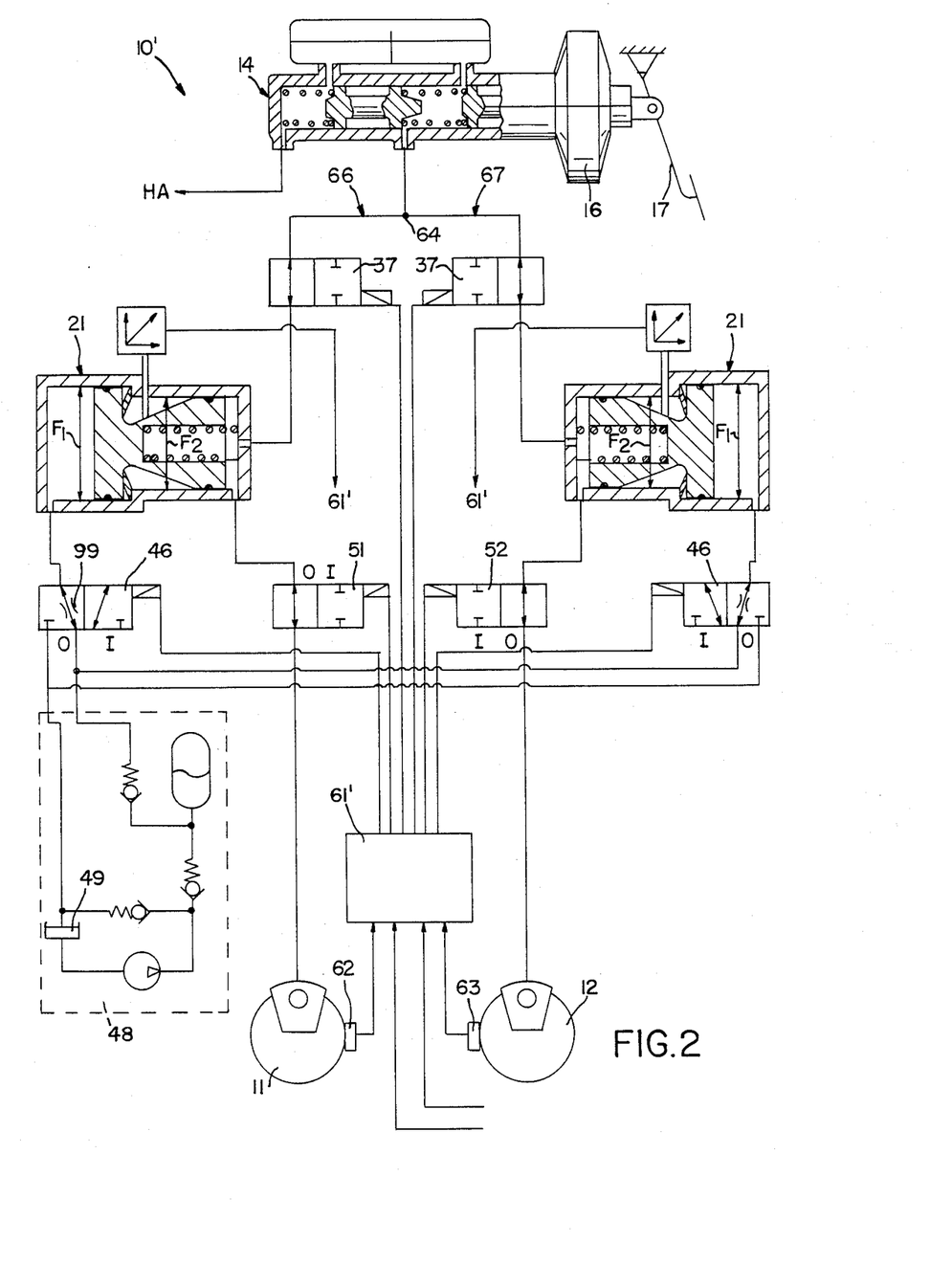
FIG. 2 shows an exemplary embodiment of the present invention having the pressure modulators associated with each of the wheel brakes subjectable to the control system, in a representation corresponding to that of FIG. 1.

However, counter-phase brake pressure control of the front wheel brakes 11 and 12 is possible in the exemplary embodiment as shown in FIG. 2. For each of the front axle brake circuit branches, denoted overall by 66 or 67 respectively, and starting from the branch point 64 of the front axle brake circuit I leading from the tandem master cylinder 14, an individual pressure modulator 21, the basic construction of which was described with the reference to FIG. 1, is provided. Also, each circuit 66, 67 includes a connection control valve 37 and an ABS control valve 46 of the type previously described for each one of the two wheel brakes 11 or 12. A single auxiliary pressure source 48 is utilized for both brake circuit branches 66 and 67 in the hydraulic circuit shown in FIG. 2.

The design of the electronic control unit 61' of the ABS 10' according to FIG. 2, required for the possibility of counter-phase control of a brake pressure at the front wheel brakes 11 and 12, is easily within the purview of a person skilled in the art and informed of the purpose of the control system, and the details thereof are believed unnecessary to enable one to use and make the invention, and thus have not been shown.

In as much as functional elements shown in FIG. 2 are denoted by the same reference symbols as in FIG. 1, reference is here made to the description associated with FIG. 1 as concerns the constructional and functional elements. As each of the front wheel circuits have individual ABS valves and pressure modulator pistons, the control 61' can, by appropriate independent actuation of the ABS valve, provide an increase pressure to one front wheel brake while simultaneously lowering the pressure to the other front wheel brakes, thus providing counter-phase control not possible in FIG. 1.

Figure 3:
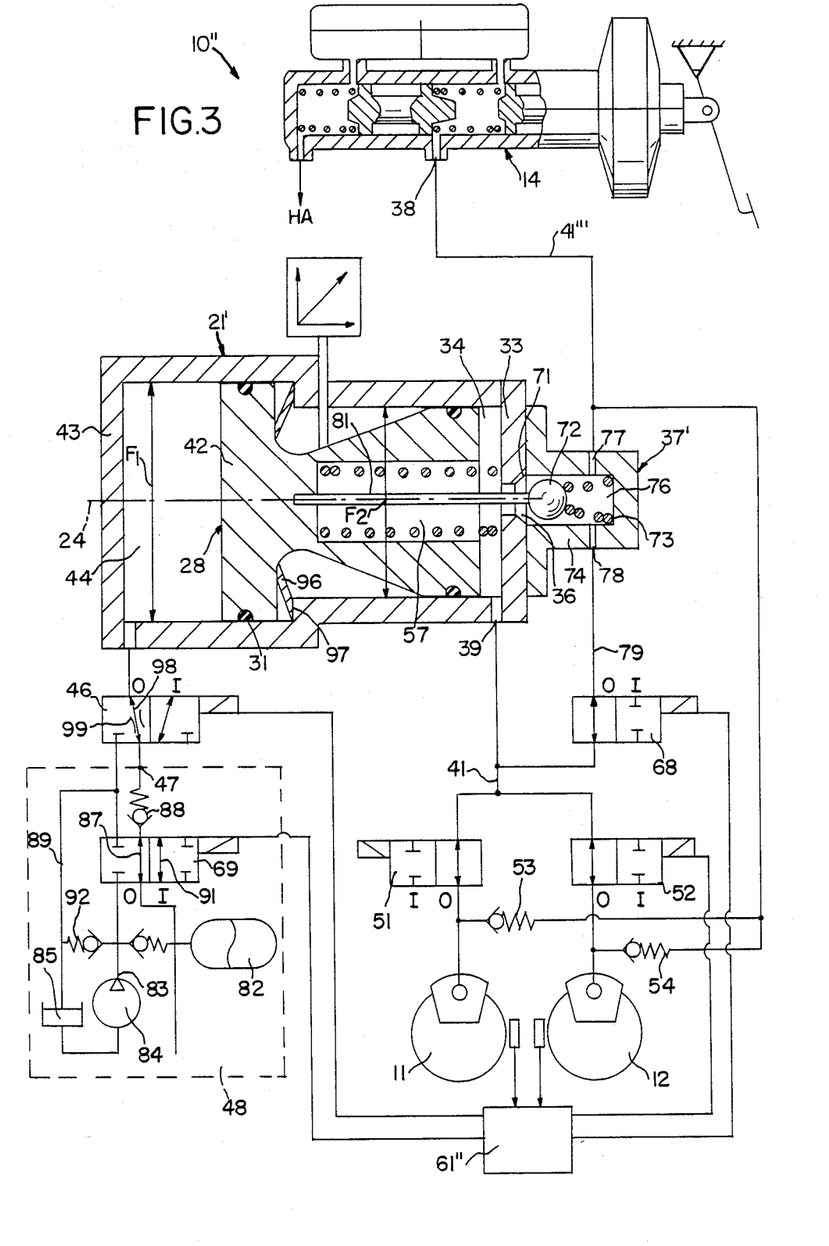
FIG. 3 shows an ABS control corresponding in it basic construction to the ABS control according to FIG. 1, but having a pressure modulator with mechanical inlet valve and electrically controllable bypass valve.

FIG. 3 shows a further exemplary embodiment of an antilocking system 10'' falling within the scope of the inventive idea, which essentially corresponds to the one shown in FIG. 1, but which differs therefrom by the special combined design of the pressure modulator 21' in conjunction with the pressure inlet valve 37'. Here a mechanical ball valve 72 controls the pressure feed from the brake booster 14 into the primary chamber 34 of the pressure modulator 21'. Also, an additional electrically controllable bypass valve 68, designed as a 2/2-way solenoid valve, is provided, by means of which the output pressure of the tandem master cylinder 14 can be coupled into the wheel brakes 11 and 12 of the front axle brake circuit I even if the inlet valve 37' has attained its blocking position as a result of a malfunction. Still further, an additional function control valve 69 is provided in combination with the ABS control valve 46 for controlling pressure feed into the drive pressure space 44 of the pressure modulator 21'.

In as much as constructional and functional elements of the ABS 10'' according to FIG. 3 is similar to the ABS 10 according to FIG. 1, reference is made to the relevant description parts of FIG. 1 in order to avoid repetition.

In the embodiment of FIG. 3, the pressure inlet valve 37' is designed as a ball-seat valve, the valve seat 71 of which is formed by a conical bevel of the pressure input channel 36. The bevel is arranged on the outer side of the end wall 33 of modulator housing 22, fixedly bounding the primary chamber 34 in axial direction, of the ball valve 72, which ball valve is continuously biased by a pretensioned valve spring 73 which attempts to push the valve ball 72 into the blocking position of the inlet valve 37'.

The inlet valve 37' comprises a pot-shaped valve housing 74, which is attached so as to be pressure tight on the outer side of the end wall 33 of the pressure modulator housing 22 and defines a valve chamber 76 which, in the open position of the inlet valve 37', is in communicating connection with the primary chamber 34 of the pressure modulator 21'. The valve chamber 76 has a pressure input 77 which is connected via the section 41''' of the master brake line of the front axle brake circuit I to the pressure outlet 38 of the tandem master cylinder 14 and a pressure outlet 78, from which the bypass flow path 79 starts, as well as an outlet around the ball-seat valve 37' to the outlet 39. Both of these outlets 38 and 78 of the pressure modulator 21' lead to the master brake line 41 of the front axle brake circuit I.

This bypass flow path 79 is open when the bypass valve 68 is in the basic "O" position, and blocked when the bypass valve 68 is in the excited "I" position.

The piston 28 of the pressure modulator 21' is provided with a central elongated bar-shaped, slender tappet 81 which, in the illustrated basic "O" unactivated ABS position of the modulator piston 28, has its free end passing through the pressure input channel 36, connecting the primary chamber 34 of the pressure modulator 21' to the valve chamber 76, and thus holds the valve ball 72 in its open position separated from the valve seat 71.

If, for example, a failure of the auxiliary pressure source 48 causes the inlet valve 37' to attain its blocking position, it is still possible to brake at the front axle by the bypass flow path 79, which is open due to the bypass valve 68 being in the basic "O" position.

The additional function control valve 69, provided within the framework of the auxiliary pressure source 48, is designed as a 4/2-way solenoid valve connected between a pressure reservoir 82 of the auxiliary pressure source 48 and its output 47, as well as between the high pressure output 83 of an accumulator-type charge pump 84 provided for charging the pressure reservoir 82 and a pressureless reservoir 86 of the auxiliary pressure source 48.

In the basic "O" position of this function control valve 69, the pressure reservoir 82 is connected via a flow path 87 of the function control valve 69 and oneway valve 88 to the pressure output 47 of the auxiliary pressure source 48. The pressure output 83 of the accumulator-type charge pump 84 is blocked from a return line 89 leading to pressureless reservoir 86. Pressure medium can flow out of the drive pressure space 44 of the pressure modulator 21' toward the pressureless reservoir 86 of the auxiliary pressure source when the ABS control valve 46 is in its excited "I" position.

In the excited "I" position of the function control valve 69 of the auxiliary pressure source 48, the pressure reservoir 82 is blocked from the pressure output 47. Since here, however, the pressure output 83 of the accumulator-type charge pump 84 is now connected via a flow path 91 of the function control valve 69 to the pressureless reservoir 86 via return line 89, the maximum pressure limiting valve 92, connected between the pressureless reservoir 86 via return line 89 and the pressure output 83 of the accumulator-type charge pump 84 is thus bridged by a bypass flow path leading over the flow path 91 of the function control valve 69. This has the advantage that when in circulating mode, i.e., when the pump 84 is activated and the reservoir 82 does not need to be charged, the accumulator-type charge pump 84 does not work against the opening pressure, determining the mazium reservoir pressure of the pressure limiting valve 92.

By switching the function control valve 69 to its excited "I" position, a pressure build-up phase of the antilocking control system, in the course of which the piston 28 of the pressure modulator 21' is subjected to a displacement in the sense of a reduction of its primary chamber 34, can also be interrupted, i.e, the modulator piston 28 can be held at a position between its possible end positions.

In this respect, the function control valve 69 is also an essential functional element of the ABS control 10". In order to attain the above-mentioned function in the embodiment according to FIG. 1, the two brake pressure control valves 51 and 52 must be driven simultaneously to their excited "I" blocking positions while the inlet control valve 37 is already occupying its excited "I" blocking position.

In the embodiment according to FIG. 3, a modification of the electronic control unit 61", which generates the control signals appropriate to the control of the ABS control valve 46, the bypass valve 68, the function control valve 69 and the brake pressure control valves 51 and 52 is easily possible for the person skilled in the art and informed of the purpose of the control system. Accordingly, the details of such a modification are not necessary for an understanding of the invention, and thus have not been shown in detail.

Further constructional and functional details can be provided in each of the exemplary embodiments.

In FIG. 1, for example, the pressure modulator 21 is equipped with a travel or position indicator 92, which generates an output signal characteristic of modulation piston position which varies continuously as the modulator piston 28 travels. This signal is supplied to the electronic control unit 61 of the ABS 10 as additional input information. This travel indicator 92 is a resistance indicator or is an inductive indicator, and records piston position by radial movement of an actuating pin 93 which is supported with its free end on a conical surface 94 of the modulator piston 28. The surface 94 extends in a taper between the flange areas 32, 42 respectively, and is sealed from the smaller bore step 26 and the larger bore step 27 of the smaller and of the larger piston step of the modulator piston 28.

The axial extension and arrangement of this conical surface 94 is such that the output signal of the position indicator 92 varies directly in proportion with the piston position in all of the possible intermediate positions of the piston 28 between its two end positions. The output signal of this position indicator 92 can be utilized in a variety of ways to monitor and control the functions of the ABS as 10 will be explained In addition to the restoring spring 59 effective throughout the total piston stroke range H, a second restoring spring 96 is provided which develops a relatively great restoring force only on a small range h thereof, H/4-H/6. This second restoring spring 96 is designed as a diaphragm spring, the modulator piston 28 supported by large piston step 42 and on the housing step 97. This second restoring spring 96 develops its maximum restoring force in the end position of the piston 28 that is associated with a minimum volume of the primary chamber 34. This second spring 96 affords no restoring contribution when the modulator piston 28 has traveled a distance h or more out of this end position in the sense of an enlargement of the volume of the primary chamber 34.

This restoring spring 96 is dimensioned such that the maximum restoring forces developed by the sum of restoring spring 59 and by the restoring spring 96, in the end position associated with a minimum volume of the primary chamber 34, is less by a small fraction of, for example, 5%–10% of the force that acts on the piston 28 when its drive pressure space 44 is subjected to the maximum output pressure of the auxiliary pressure source 48. With this design of the restoring springs 59 and 96, the output signal of the position indicator 92 can be utilized to check the functional readiness of the auxiliary pressure source 48 in a checking cycle in which the brake system is not activated and the drive pressure space is subjected to the output pressure of the pressure source 48.

In a deviation from the non-scale representation of FIG. 1, the brake booster 14 and the pressure modulator 21 are dimensioned such that the volume enlargement V, which the primary chamber 34 is subjected to when the modulator piston 28 is pushed back from its end position, associated with a minimum volume of the primary chamber 34, into its end position associate with a maximum volume of the primary chamber 34, is considerably smaller than the volume $V_{Bmax}$ of the brake fluid quantity which can be displaced into the front axle brake circuit I from the primary output pressure space 18 of the brake booster 14, when the brake booster 14 is actuated with the maximum possible pedal force.

A dimensioning relationship advantageous with respect hereto is given by the relation:

$$0.25 \leq V/V_{Bmax} \leq 0.5 \qquad (1)$$

and preferably by the relation:

$$V/V_{Bmax} \approx \tfrac{1}{3} \qquad (2).$$

As a consequence of this dimensioning of the pressure modulator 21, the pressure reduction which can be attained by a single piston stroke of the pressure modulator 21 when the antilocking control system responds and the wheel brake(s) 11 and/or 12 are subject to the control system, is no longer always sufficient to end the locking tendency.

A braking situation of this kind occurs, for example, when braking is begun on a section of roadway with a high adhesion coefficient between the roadway and the vehicle wheels, while at the same time the actuation force, and thus also the brake pressure, has been increased to almost its respective maximum value and the vehicle then reaches a section of roadway with a very low adhesion coefficient, for example of 0.3, between the roadway and the tires. In this situation, the vehicle wheels when violently braked tend to lock quickly. It is necessary in this situation for a large quantity of brake fluid to be released from the wheel brakes in order to obtain the brake pressure reduction necessary to end the locking tendency.

If, upon such a large release, the modulator piston 28 reaches its end position associated with a maximum volume of the primary chamber 34, or at least at the direct vicinity thereof, this is detected by the electronic control unit 61 of the ABS 10 from the position indicator output signal. The locking tendency continues and this tendency is detected by the electronic control unit 40 from the processing of the wheel speed sensor output signals. Then the brake pressure control valves 51 and 52 are driven to their excited "I" positions, and the ABS control valve 46 as well as the inlet control valve 37 are switched back to their basic "O" position. This results in the brake fluid, which had previously been received by the primary chamber 34 from the wheel brake(s) 11 and/or 12, now being pushed back into the primary output pressure space 18 of the tandem master cylinder 14 by the displacement of the modulator piston 28, in the sense of a reduction of the volume of the primary chamber 34, resulting from subjecting the drive pressure space 44 to pressure.

The pressure modulator 21 functions in this phase of antilocking control like a return feed pump and because brake fluid is returned to the tandem master cylinder, a pedal reaction to the activation of the antilocking control system is also discernable. At the latest, when the modulator piston 28 has reached its end position associated with a minimum volume of the primary chamber 34, which in turn is detected by the position-characteristic output signal of the position indicator 92, the pressure modulator 21 switches from return feed mode back to its pressure reduction mode, in such a way that the brake pressure control valve(s) 51 and/or 52 of the brake(s) 11 and/or 12 reduce braking pressure, by virtue of being switched back to their basic "O" positions, and the inlet control valve 37 and the ABS control valve 46 are driven back into their excited "I" positions effecting pressure reduction in the drive pressure space.

The consequent brake pressure reduction, attainable within the possible piston stroke H of the pressure modulator piston 28, is usually sufficient to cause the wheel brake(s) 11 and/or 12 to end the locking tendency which has previously occurred at the associated vehicle wheels.

The flow path 98 of the ABS valve 46 which connects the pressurized reservoir 82 of the auxiliary pressure source 48 to the drive pressure space 44 of the pressure modulator 21 when the ABS control valve 46 is in the basic "O" position, is provided with throttle 99. The throttle 99 limits the rate of pressure increase in the primary chamber 34, i.e., the temporal increase of the output pressure of the pressure modulator 21 obtained in pressure build-up phases of the antilocking control system. These are controlled by displacement of the modulator piston 28 in the sense of a reduction of the volume of the primary chamber 34 of the pressure modulator 21.

The flow resistance of this throttle 99 is so selected that, although a sufficiently large change speed of the output pressure of the pressure modulator can be obtained for a sensitive control, the speed with which the piston 28 moves in a pressure-building phase of the antilocking control system is, however, sufficiently slow to be recorded with good precision by the position indicator 92. This allows the indicator 92 to evaluate in the sense of an optimum control of pressure build-up, pressure maintenance and any pressure reduction phases which may become necessary for the antilocking control system.

Thus, in a simple manner, the output signal of the position indicator 92 is available for controlling the successive pressure build-up phases of the antilocking control system in the course of a control cycle so that the efficiency of the control system is thereby increased.

An advantageous type of pressure build-up control can occur. If the pressure build-up phase begins at a position of the modulator piston 28 associated with a maximum volume of the primary chamber 34 of the pressure modulator 21 is detected by the electronic control unit 61 from the output signal of the position indicator 92, the control unit 61 evaluates this as an indication that the preceding pressure reduction phase(s) has (have) led to a considerable reduction of pressure, and that consequently the vehicle is moving on a surface with a low adhesion coefficient to the vehicle wheels. In this case, the pressure build-up phase is interrupted by a pressure maintenance phase, after the piston 28 has been subjected to a pressure build-up displacement corresponding to approximately half of its maximum stroke H.

Following this, the output signals of the wheel speed sensors are checked to determine whether the brake slip of the vehicle wheels subject to the control system, is increasing again or decreasing further, so that the brake pressure can be increased again. If this is the case, then the next pressure build-up phase can be programmed by control 61 such that the piston 28 now executes a movement corresponding to the remainder of its possible pressure build-up stroke or, depending on the result of the check of the dynamic state of the vehicle wheels, only a part of this movement.

It is impossible to list all the possible control algorithms which are available by analogous utilization of the output signals of the position indicator 92 and the wheel speed sensor output signals, however, the possibilities existing have been sufficiently demonstrated by the control cycle explained above that it is believed unnecessary to discuss further variations of control cycles.

For the sake of completeness, however, it should be mentioned that when the input control valve 37 is switched back to its basic "O" position, not only upon the completion of one antilocking control cycle, or for a phase thereof, the pressure modulator 21 functions in the return feed mode as well as within an antilocking control cycle. For example, in a pressure build-up phase, even if the driver briefly releases the pedal 17 and then actuates the brake booster 14 immediately thereafter, the pressure modulator 21 will function in a return feed ABS mode. This situation would be detected by the electronic control unit 61 in that, according to the dynamic behavior of the vehicle wheels, control should be continued, whereas the wheel decelerations decrease briefly because brake fluid at the brakes can flow back via the one-way valves 53 and 54 and via the bypass line 56 to the tandem master cylinder 14. Then the change over of the inlet control valve 37 is subsequently able to immediately build up brake pressure again to an extent appropriate for control, something that would not be possible if the inlet control valve 37 had been kept closed in the meantime.

The description above on the function control of the inlet control valve 37 according to FIG. 1 also applies analogously to a corresponding control of the bypass valve 68 according to FIG. 3.

The piston position indicator output signals can be utilized for carrying out a range of important check functions relating to functional readiness of the ABS, for example, within the framework of a test cycle which can be automatically triggered when the ignition is switched on, or be triggered by means of a specially provided check switch at a time determined by the driver.

A possible sequence of such a test cycle, from which the switching related measures required for the realization are also evident to the person skilled in the art, are: the ABS control valve 46 is switched to its excited "I" position, while at the same time the inlet control valve 37 and the brake pressure control valves 51 and 52 occupy their basic "O" positions and are held at these positions until a pressure, previously present in the drive pressure space 44 of the pressure modulator 21, is completely reduced and the piston 28 has reached its end position (on the left according to FIG. 1) associated with a minimum volume of the primary chamber 34.

The output signal of the position indicator 92 characteristic of this end position will then be used to trigger the switching back of the ABS control valve 46 into its basic "O" position, while retaining valves 37, 51 and 52 in their basic "O" positions. Pressure will now be built up in the drive pressure space 44 of the pressure modulator 21.

While the piston 28 executes its stroke in the sense of a reduction in the primary chamber 34, the ABS control valve 46 is briefly switched back to its excited "I" position as soon as the piston has reached a given position, detectable from the output signal of the position indicator 92 between its two end positions. The reaction time of the ABS control valve 46 can be determined by differentiation of the output position indicator output signal. If the time is too great, then this is an indication that the valve 46 is sluggish and that it should be checked.

The driver can be visually notified of this malfunction by a specific display or an audible signal can be used.

If the reaction time is within a tolerable value, then the ABS control valve 46 is switched back to its basic "O" position with the piston stroke continued until it reaches its end position associated with a minimum volume of the primary chamber 34 of the pressure modulator 21. The output signal of the position indicator 92 characteristic thereof again initiates, by driving the ABS control valve 46 into its excited "I" position, the return movement of the piston to its other end position. The time the piston 28 requires in order to reach this other end position is measured. If this time span is too great, then this is an indication that the piston 28 is sluggish and another malfunction indication which may be likewise signaled to the driver.

If the test thus far indicates that the modulator 21 is working properly, then after the piston 28 has reached its end position associated with a maximum volume of the primary chamber 34, the inlet control valve 37 and the brake pressure control valves 51 and 52 are switched to their excited "I" positions, and the ABS control valve is switched back again to its basic "O" pressure build-up position. If this does not lead to a displacement of the piston which is detectable by a constant output signal of the position indicator 92, then this is an indication that the inlet control valve 37 and the brake pressure control valves 51 and 52, in their excited "I" blocking positions, are sufficiently tight.

If, however, the output signal of the position indicator 92 indicates that the piston 28 is subject to a displacement, then this would tend to be an indication that at least one of the valves 37 as well as valve(s) 51 and/or 52 is not tight. If this is not the case, however, a further check can be obtained by individually switching back the inlet control valve 37 and the brake pressure control valves 51 and 52 in succession to their basic "O" positions for a short time span and thereafter to their excited "I" positions again, each of which should cause the piston 28 to undergo a slight displacement in the direction of its right end position associated with a minimum volume of the primary chamber 34.

The reaction times of these valves 37, 51 and 52 can be determined from the temporal correlation of the individual control signals with the signal derived from differentiation of the position indicator output signals, both for the change over to their excited "I" positions, and for the switching back to their basic "O" positions The reaction times of the function control valve 69 can be determined analogously, if one of these is provided within the framework of the auxiliary pressure source 48.

Utilizing the position indicator for checking for possibilities analogous to the checking steps explained above, is limited in the FIG. 3 embodiment, in that the valve chamber 76 cannot be closed off hermetically from the brake booster 14 and that the valve ball 72, when pressure is being built up in the primary chamber 34 of the pressure modulator 21', would rise from its seat 71. Analogous checking possibilities are, however, also present in the embodiment according to FIG. 3, if the driver, when the vehicle is stationary, actuates the brake system with great force in order to hold the inlet valve 37' closed, and hereby activates the test cycle.

Finally, reference is again made below to FIG. 1 for the purpose of explaining an expedient safety measure, in which a 2/2-way solenoid bypass valve 101 is connected between output 39 of the primary chamber 34 of the pressure modulator 21 of the master brake line 41 of the front axle brake circuit I and its bypass line 56, which is in direct communicative connection with the pressure output 38 of the brake booster 14. This bypass valve 101 is driven simultaneously with the inlet valve 37 to its illustrated basic "O" through-flow position and to its excited "I" blocking position, so that if the inlet valve 37 ever sticks in its blocking position, it is still possible to brake via the bypass valve 101.

Finally, a modification of the pressure modulators 21 used in the antilocking systems according to FIGS. 1 and 2 will be explained below with reference to FIG. 4, which modification can of course also be applied analogously to the pressure modulator 21' of the antilocking system 10" according to FIG. 3.

Figure 4:
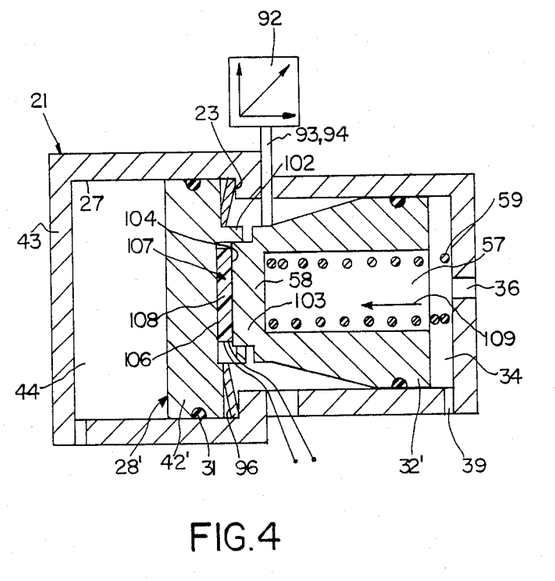
FIG. 4 shows a specific embodiment of a pressure modulator which can be used within the framework of the antilocking system according to FIGS. 1 to 3.

Inasmuch as the elements of the pressure modulators 21 according to FIG. 4 are denoted by the same reference symbols as in FIG. 1, the explanation can be restricted to the differences with the pressure modulator 21 according to FIG. 1.

In the pressure modulator 21 illustrated in FIG. 4, its piston 28' is formed in two parts with the annular flange-shaped larger piston step 42' movably defining the drive pressure space 44 and the piston flange 32' movably defining the primary chamber 34. The piston part 42' forming the larger piston step is provided on its side facing the piston flange 32' with a short pot-shaped guide shoulder 102 which projects into a short axially extending circular-cylindrical guide extension 103 of the piston flange 32' defining the primary chamber. The two piston parts 42' and 32' are slightly displaceable with respect to one another along the central longitudinal axis 24 of the pressure modulator 21 in response to the forces being applied.

Between a circular disk-shaped space 107 at end face 104 of the cylindrical guide extension 103 of the smaller piston flange 32' and the central region 106 of the inner face of the piston part forming the larger piston step 42' and its cylindrical sleeve-shaped guide extension 102, an electronic sensor 108 is provided. The sensor 108 generates an electrical output signal which is a measure of the axial force (represented by the arrow 109) with which the smaller piston part 32' is pushed against the larger piston part 42' of the piston 28.

This sensor 108, the output signal of which is thus a measure of the pressure prevailing in the primary chamber 34 of the pressure modulator 21, is represented by a circular disk-shaped element which is fixed between two piston parts 42' and 32', and which, depending on the amount of effective force, can be more or less (elastically) compressed or deformed in axial direction in the circular disk-shaped space. The output signal of this sensor 108 being proportional to its respective axial compression or deformation.

A sensor element of this type can be: a piezoelectric crystal, e.g. a quartz plate; a deformation-sensitive resistance material; or expansion measuring strips which are arranged on a peripherally supported plate which is subjected to a curved deflection under the influence of the force 109 acting on the smaller piston flange 32'. Sensors 108 of the types outlined above are very sensitive and generate output signals, proportional to the pressure, with only a very small deformation stroke. They have small dimensions and can therefore be easily accommodated in the space 107 bounded by its pistons 42' and 32' without contributing significantly to the construction size of the pressure modulator or its piston 28'.

The output signal of the pressure sensor 108 characteristic of the pressure in the primary chamber 34 of the pressure modulator 21 may, if appropriate in conjunction with the output signals of the wheel speed sensors 62 and 63, be used for controlling pressure reduction phases of the antilocking control system as well as for controlling a requirement-oriented pressure metering in pressure build-up phases of the antilocking control system.

In pressure reduction or pressure build-up phases of the antilocking system 10, the additional restoring spring 96 is released and the piston 28' occupies a position which is not supported on the additional restoring spring 96. Here the output signal of the pressure sensor 108 is both a measure of the pressure prevailing in the primary chamber 34 and that prevailing in the drive pressure space 44 of the pressure modulator 21, which are equal, or at least approximately equal. An operating situation of this kind can be detected by the associated output signal of the position indicator 92.

In conjunction with the output signals of the position indicator 92, a very sensitive control of the antilocking control phases is thus possible with the aid of the output signals of the pressure sensor 108.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An antilocking system for a road vehicle having vehicle wheels with a hydraulic multiple circuit wheel brake system, comprising:

at least one closed static brake circuit which is connected to at least one wheel brake from an output pressure space of a brake booster in which an output pressure proportional to an actuation force is generated;

the connection including an inlet valve means for connecting said brake booster to a primary chamber of a pressure modulator means having a pressure output line leading to said at least one wheel brake via at least one electrical 2/2-way solenoid controllable brake pressure control valve means for controlling pressure build-up, pressure reduction and pressure maintenance phases respectively of said antilocking control system;

said at least one wheel brake connected to or closed from said output of said primary chamber of said brake pressure control valve means;

said pressure modulator means having a hydraulically driven piston pump;

a drive pressure space connected to said pressure modulator means to displace said piston pump;

an electrically controllable ABS function control valve means connecting said drive pressure space alternatively to a pressure output of a hydraulic auxiliary pressure source and to its pressureless reservoir;

said piston pump separating said primary chamber from said drive pressure space;

said piston pump being displaceable by the pressure in said drive pressure space when said inlet valve is open;

said piston pump displacement being opposed by a powerful restoring spring and against pressure prevailing in said primary chamber;

said piston pump being displaced to an end position associated with a minimum volume of said primary chamber when said drive pressure space is connected to said auxiliary pressure source by said ABS function control valve means, and to another end position associated with a maximum volume of said primary chamber of action of said restoring spring, when said ABS function control valve means connects said drive pressure space to said reservoir of said auxiliary pressure source;

said maximum volume expansion or minimum volume reduction of said primary chamber corresponding to between 25% and 50% of a volume of brake fluid quantity which is expelled by an actuation of said brake booster with the maximum force actuation which is applied into said brake circuit;

an electronic ABS control unit means for generating control signals required for the appropriate control of said ABS function control valve means and of said at least one brake pressure control valve in response to vehicle wheel speed proportional to output signals from vehicle wheel speed sensors associated with said vehicle wheels;

said inlet valve means operating as a change over solenoid valve which in a normal non-ABS brake mode, occupies a basic position connecting said primary chamber of said pressure modulator means to said pressure output of said brake booster;

said inlet valve means controlled by output signals of said ABS electronic control unit to an excited position closing off said primary chamber of said pressure modulator means from said pressure output of said brake booster, during pressure reduction as well as pressure build-up phases of said antilocking control system; and said inlet valve means being switched back to its basic position when said pressure modulator functions in a return feed mode at the same time as said brake pressure control valve means, connected to said modulator means, are switched back to excited positions.

2. An antilocking system according to claim 1, wherein position indicator means are provided which generate electrical output signals characteristics of the position of said piston pump;

said output signals being connected to said ABS electronic control unit means as further information inputs; and said inlet control valve means being switched back to its basic position during an antilocking control cycle, comprising several pressure reduction, pressure maintenance, and pressure build-up phases, when said ABS function control valve means has been switched to its basic position and said at least one brake pressure control valve means is in its excited position, and wherein, said output signal of said position indicator means indicates that said piston pump is moving to its end position associated with a minimum volume of said primary chamber.

3. An antilocking system according to claim 1, wherein said inlet valve means, after having been driven to its excited position in the course of an antilocking control phase, is switched back into its basic position even if in the course of control, vehicle deceleration, detectable as a result of the change of said output signals of said wheel speed sensors, lessens by more than a given threshold value.

4. An antilocking system according to claim 1, wherein said at least one wheel brake subjectable to said antilocking control system, is connected via a one-way valve to a bypass line leading to said pressure output of said brake booster.

5. An antilocking system according to claim 1, wherein said ABS function control valve means has a flow path for effecting the connection of said pressure output of said auxiliary pressure source to said drive pressure space of said pressure modulator means when said ABS function control valve means is in said basic position and which flow path is provided with a throttle means, which restricts the pressure medium flow rate to said drive pressure space in said pressure modulator means to a given value.

6. An antilocking system according to claim 1, wherein a further ABS controlled function control valve means is provided between said ABS function control valve means and a pressure reservoir means of said auxiliary pressure source chargeable by an accumulator-type charge pump;

said pressure reservoir means being maintained at a specific output pressure level by opening of a pressure-limiting valve connected between said pressure output of said charge pump and a return line leading to a pressureless reservoir of the charge pump;

said further ABS function control valve means being connected via a one-way valve to the ABS function control valve means when said pressure output of said charge pump is closed from said return line and said further ABS function control valve means is in its basic position; and wherein said further ABS function control valve means, in its excited position, closes off said pressure reservoir means from said pressure output of said auxiliary pressure source while said pressure output of said charge pump is connected to said return line leasing to the pressureless reservoir of said pump of said auxiliary pressure source.

7. An antilocking system according to claim 1, wherein the pressure modulator means has a step cylinder having at least two bore steps of different diameters which merge into one another via a housing step;

said piston pump comprising a corresponding stepped modulator piston pump with a larger piston step forming a movable delimitation of said drive pressure space and a smaller piston step forming a movable delimitation of said primary chamber of the pressure modulator means;

said piston being sealed against the respective stepped bore and having a central tapering section with a conical outer surface on which an actuating pin of a piston indicator is radially supported; and wherein said piston position indicator comprises a voltage converter, by means of which radial displacements of said actuating pin, associated with axial movements of said piston pump, are converted into voltage signals which are processed by said ABS electronic control unit.

8. An antilocking system according to claim 7, wherein said restoring spring biases said piston pump into its end position associated with a maximum volume of said primary chamber and is designed as a helical pressure spring which is accommodated in a central blind bore of said modulator piston pump in a section of its length approximately corresponding to an axial extension of said smaller piston step and said tapering conical central section of said piston pump.

9. An antilocking system according to claim 1, wherein said piston pump is supported in said housing of said pressure modulator means, and wherein an additional restoring spring means, the restoring force of which is of a maximum at the position associated with a minimum volume of Said primary chamber, biases said piston pump as it is displaced increasingly away from this minimum volume position; and wherein this addition restoring force reduces to a zero value at ¼ to ⅓ of said total stroke of said piston.

10. An antilocking system according to claim 9, wherein the sum of the maximum values of the restoring forces of both of said restoring springs and the force of said brake booster acting upon said smaller piston step in said primary chamber operate in the sense of an enlargement of said primary chamber volume, and are of a value which is at least less than, or approximately equal to, the force in said drive pressure space which displaces said piston pump into its end position associated with a minimum volume of said primary chamber when said piston pump is subjected to the output pressure of said auxiliary pressure source.

11. An antilocking system according to claim 10, wherein said further restoring spring is a diaphragm spring which is supported on one side by a housing step of said pressure modulator housing.

12. An antilocking system according to claim 1, wherein there are at least two braking circuits and each braking circuit includes its own pressure modulator means, inlet valve, brake pressure control valve and ABS control valve.

13. An antilocking system according to claim 1, wherein a 2/2-way solenoid bypass valve means is connected between a pressure output of the brake booster and said connection, leading from a pressure output of said primary chamber of said pressure modulator means to said at least one wheel brake, and wherein said bypass valve means and said inlet valve means are controlled together to move from a basic position into an excited blocking position.

14. An antilocking system according to claim 1, wherein the piston pump is provided with an electronic pressure sensor means which generates an electrical output signal characteristic of the pressure in the primary chamber of the pressure modulator means.

15. An antilocking system according to claim 14, wherein the modulator piston pump comprises a piston part forming the larger piston step and a piston part forming the smaller piston step which are arranged so as to be mutually displaceable; said pressure sensor means comprising a sensor element fixed between these two piston parts which is subjected to a compression or deformation due to the force resulting from the subjection of one piston part to the pressure prevailing in the primary chamber of the pressure modulator, and which generates an electrical output signal proportional to said force.

16. An antilocking system according to claim 14, wherein the sensor means is designed as at least one of a compression-sensitive and expansion-sensitive electrical resistor and as a piezoelectric element.

* * * * *